United States Patent
Yin et al.

(10) Patent No.: US 9,723,551 B2
(45) Date of Patent: Aug. 1, 2017

(54) METHOD AND RADIO NETWORK NODE FOR RANKING CELLS IN A CELLULAR NETWORK

(75) Inventors: Hui Yin, Beijing (CN); Jun Wu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/367,999

(22) PCT Filed: Dec. 23, 2011

(86) PCT No.: PCT/CN2011/084578
§ 371 (c)(1),
(2), (4) Date: Jun. 23, 2014

(87) PCT Pub. No.: WO2013/091249
PCT Pub. Date: Jun. 27, 2013

(65) Prior Publication Data
US 2014/0364127 A1    Dec. 11, 2014

(51) Int. Cl.
*H04W 36/00* (2009.01)
*H04W 52/02* (2009.01)
(Continued)

(52) U.S. Cl.
CPC ....... *H04W 52/0203* (2013.01); *H04W 24/08* (2013.01); *H04W 36/38* (2013.01);
(Continued)

(58) Field of Classification Search
CPC . H04W 48/20; H04W 24/08; H04W 52/0206; H04W 36/38; H04W 52/0203; H04W 76/048; Y02B 60/50
See application file for complete search history.

(56) References Cited

U.S. PATENT DOCUMENTS

2004/0198408 A1   10/2004   Dillon et al.
2009/0290561 A1   11/2009   Kleindl
(Continued)

FOREIGN PATENT DOCUMENTS

| CN | 101083831 | 12/2007 |
|---|---|---|
| WO | WO 2011/138346 | 11/2011 |
| WO | WO 2011/138351 | 11/2011 |

OTHER PUBLICATIONS

PCT International Preliminary Report on Patentability for International Application No. PCT/CN2011/084578, Jun. 24, 2014.
(Continued)

*Primary Examiner* — Ajit Patel
(74) *Attorney, Agent, or Firm* — Baker Botts, LLP (57) ABSTRACT

A method in a radio network node for ranking cells within a group of cells in a cellular network is provided. The radio network node is serving a first cell, in the group of cells. The radio network node receives (201) power level measurements from one or more user equipments. The power level measurements respectively indicate a power level in at least one cell of the group of cells where the respective one or more user equipments is active. The radio network node then ranks (202) importance of the cells in the group of cells, both based on the power level measurements, and on the number, for each cell out of the group of cells, of user equipments whose power level measurements indicate that the respective cell has the highest power level.

20 Claims, 5 Drawing Sheets

(51) Int. Cl.
   *H04W 24/08*   (2009.01)
   *H04W 36/38*   (2009.01)
   *H04W 76/04*   (2009.01)

(52) U.S. Cl.
   CPC ..... *H04W 52/0206* (2013.01); *H04W 76/048* (2013.01); *Y02B 60/50* (2013.01)

(56) References Cited

U.S. PATENT DOCUMENTS

| | | | |
|---|---|---|---|
| 2010/0048237 A1* | 2/2010 | Kishiyama | H04W 52/242 455/522 |
| 2010/0189023 A1 | 7/2010 | Lindgren et al. | |
| 2010/0240371 A1 | 9/2010 | Cook et al. | |
| 2011/0170481 A1* | 7/2011 | Gomes et al. | 370/328 |
| 2012/0135731 A1* | 5/2012 | Rangaiah et al. | 455/434 |
| 2012/0135732 A1* | 5/2012 | Magadi Rangaiah et al. | 455/434 |
| 2012/0244869 A1* | 9/2012 | Song | H04W 52/0206 455/449 |
| 2013/0053039 A1* | 2/2013 | Jorguseski | H04W 24/02 455/436 |
| 2014/0057632 A1* | 2/2014 | Hole et al. | 455/436 |

OTHER PUBLICATIONS

International Search Report for International Application No. PCT/CN2011/084578, Oct. 4, 2012.
"Optimal Energy Savings in Cellular Access Networks" by Marsan et al., 2009.
"An Energy Efficient Power Control Mechanism for Base Stations in Mobile Communication Systems" by Lee et al., 2011.
"Green Mobile Access Network with Dynamic Base Station Energy Saving" by Zhou et al., 2009.
EPO Extended European Search Report for Application No./Patent No. 11878184.8-1855 / 2795974 PCT/CN2011084578, Jul. 1, 2015.
European Patent Office, Communication pursuant to Article 94(3) EPC, Application No. 11 878 184.8-1855, Ref. E124010017/CB, dated Mar. 15, 2016, 4 pages, Mar. 15, 2016.

* cited by examiner

METHOD AND RADIO NETWORK NODE FOR RANKING CELLS IN A CELLULAR NETWORK

PRIORITY

This nonprovisional application is a U.S. National Stage Filing under 35 U.S.C. §371 of International Patent Application Serial No. PCT/CN2011/084578, filed Dec. 23, 2011 and entitled "Method And Radio Network Node For Ranking Cells In A Cellular Network."

TECHNICAL FIELD

Embodiments herein relate to a radio network node and methods therein. In particular it relates to ranking cells within a group of cells in a cellular network.

BACKGROUND

Communication devices such as User Equipments (UE) are also known as e.g. mobile terminals, wireless terminals and/or mobile stations. User equipments are enabled to communicate wirelessly in a cellular communications network or wireless communication system, sometimes also referred to as a cellular radio system or a cellular network. The communication may be performed e.g. between two user equipments, between a user equipment and a regular telephone and/or between a user equipment and a server via a Radio Access Network (RAN) and possibly one or more core networks, comprised within the cellular communications network.

User equipments may further be referred to as mobile telephones, cellular telephones, laptops, or surf plates with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity, such as another user equipment or a server.

The cellular communications network covers a geographical area which is divided into cell areas, wherein each cell area is served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations. In the context of this disclosure, the expression Downlink (DL) is used for the transmission path from the base station to the user equipment. The expression Uplink (UL) is used for the transmission path in the opposite direction i.e. from the user equipment to the base station.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

The extensive growth in the number of users and service usage time contributes an increasing demand for energy consumption in the field of cellular networks. To reduce the energy consumption in cellular networks is desirable which would not only minimize the environmental impact on climate change, but also reduce the operational expenses. The RBS contribute a significant portion of the whole network energy consumption. Therefore, it will be very valuable if the energy consumption of the RBS can be greatly reduced.

In order to solve this problem, several power saving schemes have recently been proposed on RBS. One way is to use more energy efficient BS hardware, or using site solutions to reduce the energy consumption of BS, such as efficient cooling systems, etc.

Another way is related to system level features, to balance between energy consumption and performance, aiming at intelligent control of the network elements. Furthermore, the renewable sources may be used to power RBS, especially solar or wind power or a combination of both.

Among the system level features, the main concept is to continuously detect the traffic load in a certain area. The traffic load in cellular networks varies greatly from time to time. Because the current radio systems are always optimized for maximum load, a large amount of energy will be wasted when the real traffic load is small. Therefore, when the traffic load is low, the current cell may be switched off or turned into sleep mode. The network traffic may be assumed to vary due to two effects: typical day-night behaviour of users and the daily swarming of users carrying their user equipments from residential areas to office districts and back. In "M. A. Marsan, L. Chiaraviglio, D. Ciullo and Mi. Meo, *Optimal Energy Savings in Cellular Access Networks, Proc. IEEE ICC '09 Workshop, GreenComm, 2009*", a simple analytical model for energy saving and energy-aware management of cellular access networks is disclosed. It saves energy by reducing the number of active cells during the periods when they are not necessary because traffic is low. When some cells are switched off, radio coverage is taken care of by the cells that remain active, so as to guarantee that service is available over the whole area. The simulation shows that energy savings of the order of 25-30% are possible. The main disadvantage of this solution is that the traffic is assumed in a very simplified way. Thus, the targets are assumed to be fixed, and the time variation of the "traffic" is not explored.

Moreover, distance between base station and the user equipment may be used for efficient sector power control. In "*Document S. Hwan Lee, Y. Choi, S. Park, S. Hyong Rhee, An energy efficient power control mechanism for base stations in mobile communication systems, Proceedings of Information Networking (ICOIN), 2011*" an energy efficient power control mechanism for base station in mobile communication systems is provided. Further, an efficient sector power control based on distance between base station and mobile node is disclosed. Also a sleep mode energy control mechanism is provided. In a sleep mode energy saving protocol, each sector monitors the number of user equipments in a sector cell. If the number of user equipments falls below a given threshold in the sector cell, the base station shuts down its power. Simulation demonstrate that the transmitting energy may be saved by proposed algorithms, and there is a trade-off between energy saving and cell coverage.

When some cells are turned off, the reliable coverage and service provisioning is worsened.

SUMMARY

It is therefore an object of embodiments herein to provide a way of saving power and still provide good service in cellular networks.

According to a first aspect of embodiments herein, the object is achieved by a radio network node for ranking cells within a group of cells in a cellular network. The radio network node is serving a first cell, in the group of cells. The radio network node receives power level measurements from one or more user equipments. The power level measurements respectively indicate a power level in at least one cell of the group of cells where the respective one or more user equipments is active. The radio network node then ranks importance of the cells in the group of cells, both based on the power level measurements, and on the number, for each cell out of the group of cells, of user equipments whose power level measurements indicate that the respective cell has the highest power level.

According to a second aspect of embodiments herein, the object is achieved by a radio network node for ranking cells within a group of cells in a cellular network. The radio network node is adapted to serve a first cell in the group of cells. The radio network node comprises a receiving port configured to receive power level measurements from one or more user equipments. The power level measurements respectively indicate a power level in at least one cell of the group of cells where the respective one or more user equipments is active. The radio network node further comprises a ranking circuitry configured to rank importance of the cells in the group of cells based on the power level measurements, and based on the number, for each cell out of the group of cells, of user equipments whose power level measurements indicate that the respective cell has the highest power level.

When a cell is switched off power is saved. Since the cells in the group of cells are ranked based on both the power level measurements, and on the number, for each cell out of the group of cells, of user equipments whose power level measurements indicate that the respective cell has the highest power level, a cell with a low ranking can be switched off and cells with a high ranking are kept active. Since the high ranked cells are kept active, a good service can still be provided.

An advantage with embodiments herein is that the power saving is very effective. By switching off low ranked cells and thereby shutting down the power of a base station serving these cells, energy savings on the order of 25-30% are possible.

A further advantage with embodiments herein is that they fully take advantage of the information on the ranked cells in the group of cells and reduce inter-cell interference. Since the user equipment information is shared among the cells in the group of cells, they may negotiate which cell should be shut down and how beamforming should be performed in order to avoid or reduce inter-cell interference. Beamforming may be performed in such a way that the transmitting power of one cell keeps away from another cell's main reception lobe.

A yet further advantage with embodiments herein is that cell priority judgment guarantees that the best cell is always in service. It assures call quality and reduces loss of calls.

BRIEF DESCRIPTION OF THE DRAWINGS

Examples of embodiments herein are described in more detail with reference to attached drawings in which.

DETAILED DESCRIPTION

Embodiments will be exemplified in the following non-limiting description.

Embodiments herein provide an adaptive power saving scheme based on ranking of cells in a group of cells. Ranking of cells in the group of cells are first derived from received reports from user equipments within the group of cells. The ranking is then used to determine the different cell actions according to certain rules.

Figure 1:
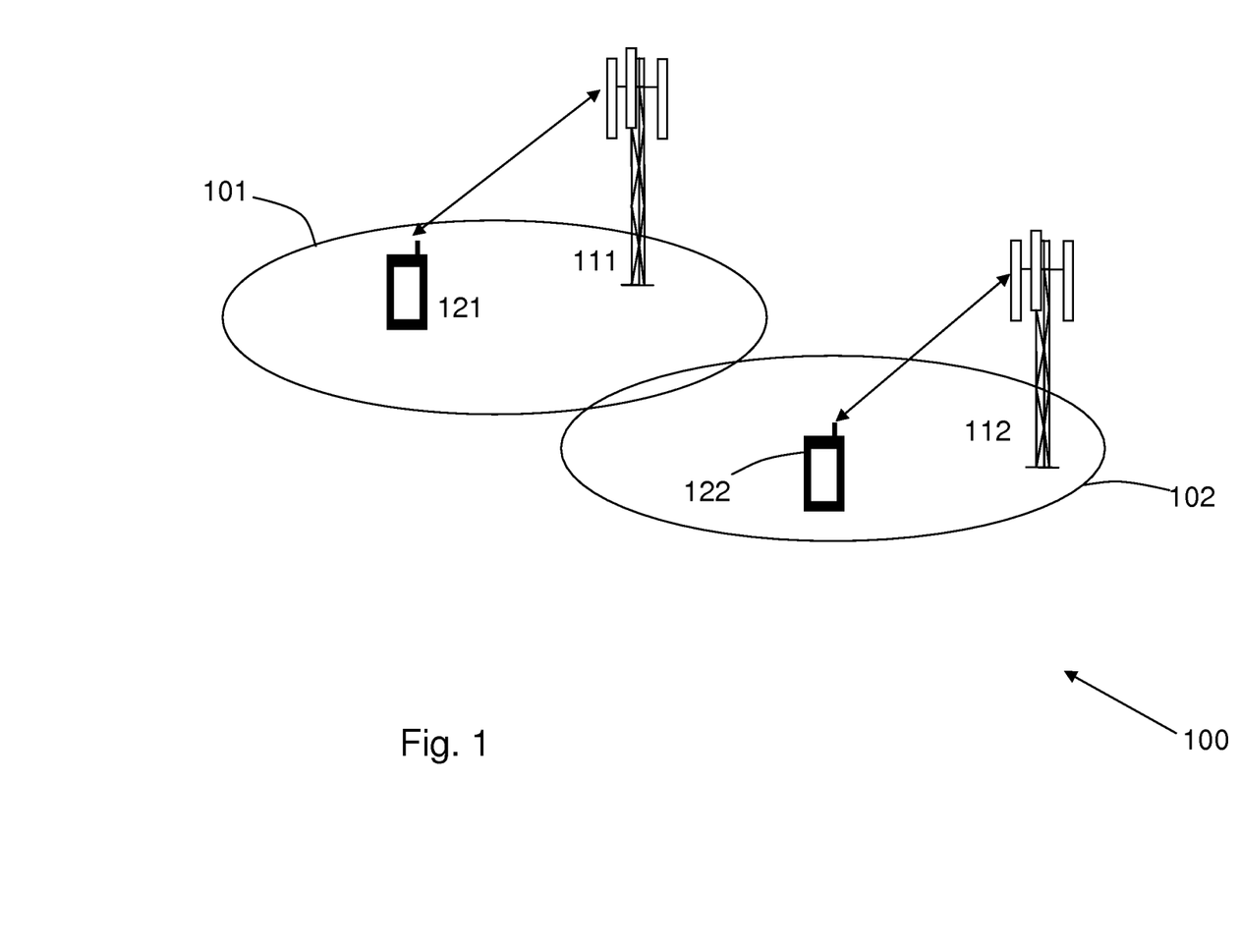
FIG. 1 is a schematic block diagram illustrating embodiments in a cellular network.

FIG. 1 depicts a cellular network 100 in which embodiments herein may be implemented. The cellular network 100 is a wireless communication network such as an LTE, WCDMA, GSM network, any 3GPP cellular network, Wimax, or any cellular network or system.

The cellular network 100 comprises a group of cells which in this first simple example comprises two cells referred to as a first cell 101 and a second cell 102. The cells in the group of cells may be neighbouring cells. A first radio network node 111 is serving the first cell 101 and a second radio network node 112 serves the second cell 102. The radio network nodes 112 may be radio base stations such as e.g. eNBs, eNodeBs, or Home Node Bs, Home eNode Bs or any other network nodes capable to serve a user equipment or a machine type communication device in a cellular network.

A number of user equipments are located in and may be active in the group of cells. In this first simple example in the scenario of FIG. 1, two user equipments are active in the group of cells. A first user equipment 121 is active in the first cell 101 and is configured to communicate within the cellular network 100 via the first radio network node 111. Further, a second user equipment 122 is active in the second cell 102 and is configured to communicate within the cellular network 100 via second radio network node 112. The number of active user equipments in the group of cells may vary from only one up to a high number of user equipments. The user equipments 121 and 122 may e.g. be mobile terminals or wireless terminals, mobile phones, computers such as e.g. laptops, Personal Digital Assistants (PDAs) or tablet computers, sometimes referred to as surf plates, with wireless capability, or any other radio network units capable to communicate over a radio link in a wireless network.

The first radio network node 111 is from now on referred to as the radio network node 111. Embodiments of a method in the radio network node 111 for ranking cells with in a group of cells 101, 102 in the cellular network 100, will now be described with reference to a flowchart depicted in FIG. 2. Here a general embodiment and an example embodiment of a simple scenario such as the scenario in FIG. 1 will be discussed in parallel. As mentioned above the radio network node 111 is serving the first cell 101. The group of cells comprises the first cell 101 and at least one more cell 102. In the simple scenario the group of cells comprises the first cell 101 and the second cell 102. The cellular network 100 further comprises one or more active user equipments 121, 122. Each said active user equipment 121, 122 is active in at least one cell of said group of cells 101, 102. In the simple scenario one user equipment 121 is active in the first cell 101, and one user equipment 122 is active in the second cell 102. That a user equipment is active means that the user equipment is working and not in sleep mode, i.e. it is interacting with the cells, measuring the power level of cells, and can handover to other cells when necessary. The method comprises the following actions, which actions may be taken in any suitable order.

Action 201

Figure 2:
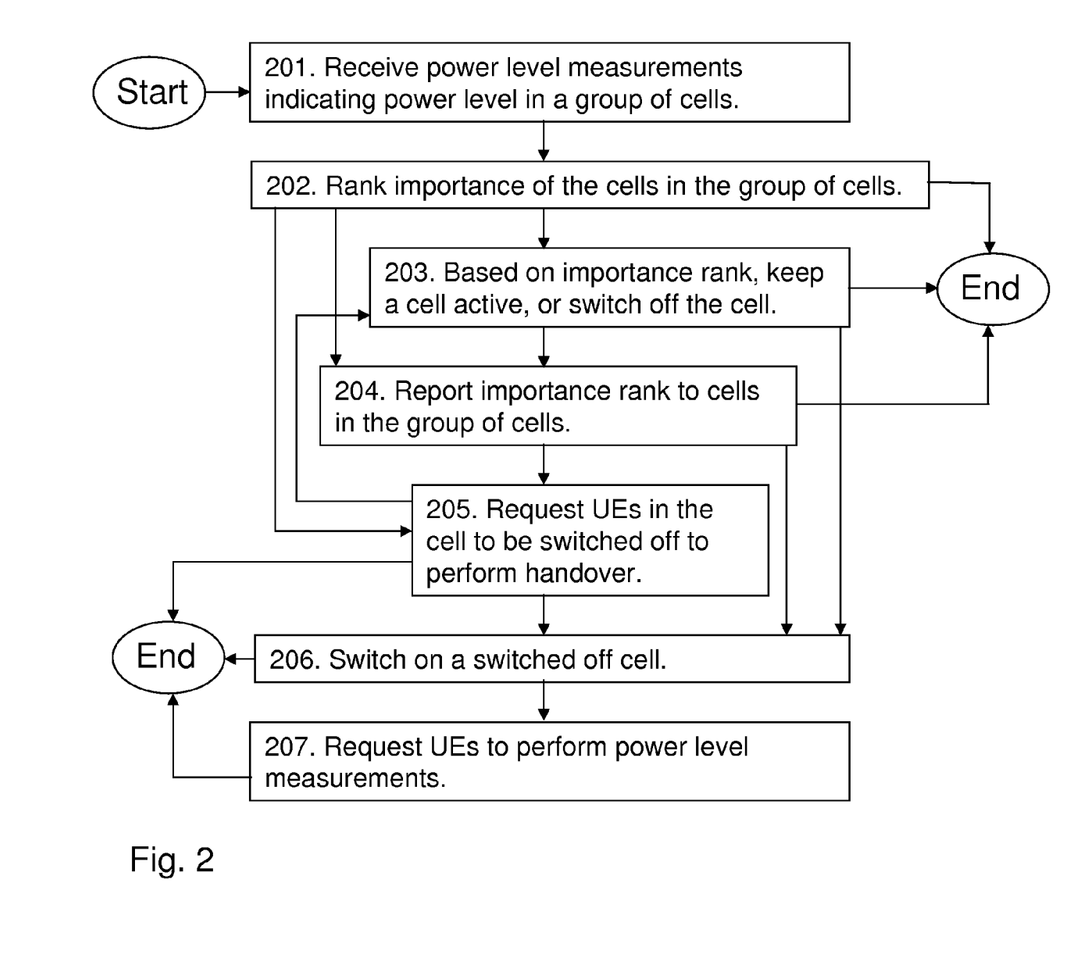
FIG. 2 is a flowchart depicting embodiments of a method in a radio network node.

In this action, information is collected to be able to rank the importance of the group of cells 101, 102. The radio network node 111 receives power level measurements from one or more of the active user equipments 121, 122. The power level measurements respectively indicate a power level in at least one cell of the group of cells 101, 102 where the respective one or more active user equipments 121, 122 is active. In the simple scenario, the radio network node 111 receives power level measurements regarding the respective first cell 101 and second cell from the first user equipment 121. Further the radio network node 111 receives power level measurements regarding the respective first cell 101 and second cell from the second user equipment 122. The power level measurements from the second user equipment 122 may be received by the radio network node 111 via the radio network node 112. In the simple scenario, for example the first user equipment 121 reports that the first cell 101 has the second highest power level, and the second cell has the highest power level. Further, the second user equipment 122 reports that the first cell 101 has the second highest power level, and the second cell 102 has the highest power level.

In some embodiments the radio network node 111 receives reports from one or more of the other cells in the group of cells 102, 103 104. The reports comprises information about their respective rank of importance of the cells in a related group of cells to share the ranking information with the radio network node 111. In these embodiments this action of ranking of importance may be based on these reported rank of importance.

Action 202

The radio network node 111 then ranks importance of the cells in the group of cells 101, 102, based on the power level measurements, and based on the number of active user equipments 121, 122 whose power level measurements indicate that a specific cell of out of the group of cells 101, 102, has the highest power level. This means that the radio network node 111 ranks the importance of the cells in the group of cells 101, 102, 103, 104 based on both the power level measurements, and on the number, for each cell out of the group of cells, of user equipments 121, 122, 123, 124 whose power level measurements indicate that the respective cell 101, 102, 103, 104 has the highest power level. In the simple scenario, the second cell 102 is ranked as having the highest rank of importance and the first cell 101 is ranked as having the second highest importance.

Action 203

Based on the of importance of the first cell 101, the radio network node 111 keeps the first cell active, or switches off the first cell 101 thereby saving power. How this is determined will be discussed more in detail below. To switched off a cell may be performed by switching off the Power Amplifier of the cell to be switched off. This means that the radio transmission for the cell is switched off.

The action of keeping the first cell 101 active may be is performed when the rank of importance of the cells in the group of cells 101, 102 indicates that the importance of the first cell 101 is highest.

The action of switching off the first cell 101 may be performed when the rank of importance of the cells indicates that the importance of the first cell 101 is lower than the importance of the cell having the highest rank of importance in the group of cells 101, 102 and the number of active user equipments 121, 122 in the group of cells 101, 102 whose power level measurements indicate that the first cell 101 has the highest power level, is below a first threshold value.

Since both the first user equipment 121 and the second user equipment 122 reports that the first cell 101 has the second highest power level and the second cell 102 has the highest power level in the simple scenario, the first cell 101 may be switched off here. The first user equipment 121 may advantageously be handed over to the second cell 101 before switching off the first cell 101. This will be further described below.

The action of keeping the first cell 101 active may also be performed when both the rank of importance of the cells indicates that the importance of the first cell 101 is lower than the importance of the cell having the highest rank of importance in the group of cells 101, 102, and the number of active user equipments 121, 122 in the group of cells 101, 102 whose power level measurements respectively indicate that the first cell 101 has the highest power level, is between the first threshold value and a second threshold value.

The action of keeping the first cell 101 active, may further be performed when both the rank of importance of the cells indicates that the importance of the first cell 101 is lower than the importance of the cell having the highest rank of importance in the group of cells 101, 102 and the number of active user equipments 121, 122 in the group of cells 101, 102 whose power level measurements respectively indicate that the first cell 101 has the highest power level, exceeds the second threshold value.

The radio network node 111 may determine the first threshold value, the second threshold value, and/or the third threshold value based on long term prediction. How this is performed will be explained more in detail below.

In the cases when the first cell 111 shall not be switched off and accordingly no power is saved, the radio network node 111 may perform adaptive beam forming in the first cell 101 when kept active in order to save power in the first cell 101.

Beamforming is a signal processing technique used in sensor arrays for directional signal transmission or reception. This is achieved by combining elements in the array in a way where signals at particular angles experience constructive interference while other signals experience destructive interference. Beamforming may be used at both the transmitting and receiving ends in order to achieve spatial selectivity. The improvement compared with an omnidirectional reception and transmission is known as the receive/transmit gain or loss. This saves power since limited radio power may be concentrated to the positions of the active user equipments, i.e. main lobes may be formed aiming at certain directions using adaptive beamforming. The receive/transmit gain compared with an omnidirectional reception/transmission provides similar receive/transmit performance in the selected directions of the lobes while reducing transmitting power because transmission does not occur in all directions. Beamforming is performed in such a way that the transmitting power of one cell is kept away from another cell's main reception lobe.

Action 204

To share the ranking information with the other cell 102 in the group of cells, the radio network node 111 may send a report to the radio network node serving the at least one cell of the group of cells 101, 102. I.e. not to the first cell served by the network node 111. The report comprises the ranking of importance of the cells in the group of cells 101, 102. In the simple scenario, the radio network node 111 sends the information to the radio network node 112 serving the second cell 102.

Action 205

Before the action of switching off the first cell 101 is performed the radio network node may request the user equipments 121 that are active in the first cell 101 to perform handover to another cell that is active. In the simple scenario, the first user equipment 121 is requested to perform handover to the second cell 102 before switching off the first cell 101. Note that this action will be performed before Action 203.

Action 206

When the first cell 101 has been switched off the radio network node 111 may switch on the first cell 101 again.

This may e.g. be performed when the radio network node 111 obtains information that the number of active user equipments 121, 122 in the group of cells 101, 102 has exceeded a third threshold value.

If the third threshold value is not exceeded or as an alternative, this may e.g. be performed by switching on the first cell 101 or at least partly switching on the first cell 101, after a time period starting from the point in time when the first cell 101 was switched off. The radio network node 111 may have determined the time period based on long term prediction. How this is performed will be explained more in detail below.

Action 207

The radio network node 11 may request the user equipments 121 to perform power level measurements and choose an appropriate cell accordingly, which user equipments 121 were located within the first cell 101 that was switched off and then has been switched on again.

Figure 3:
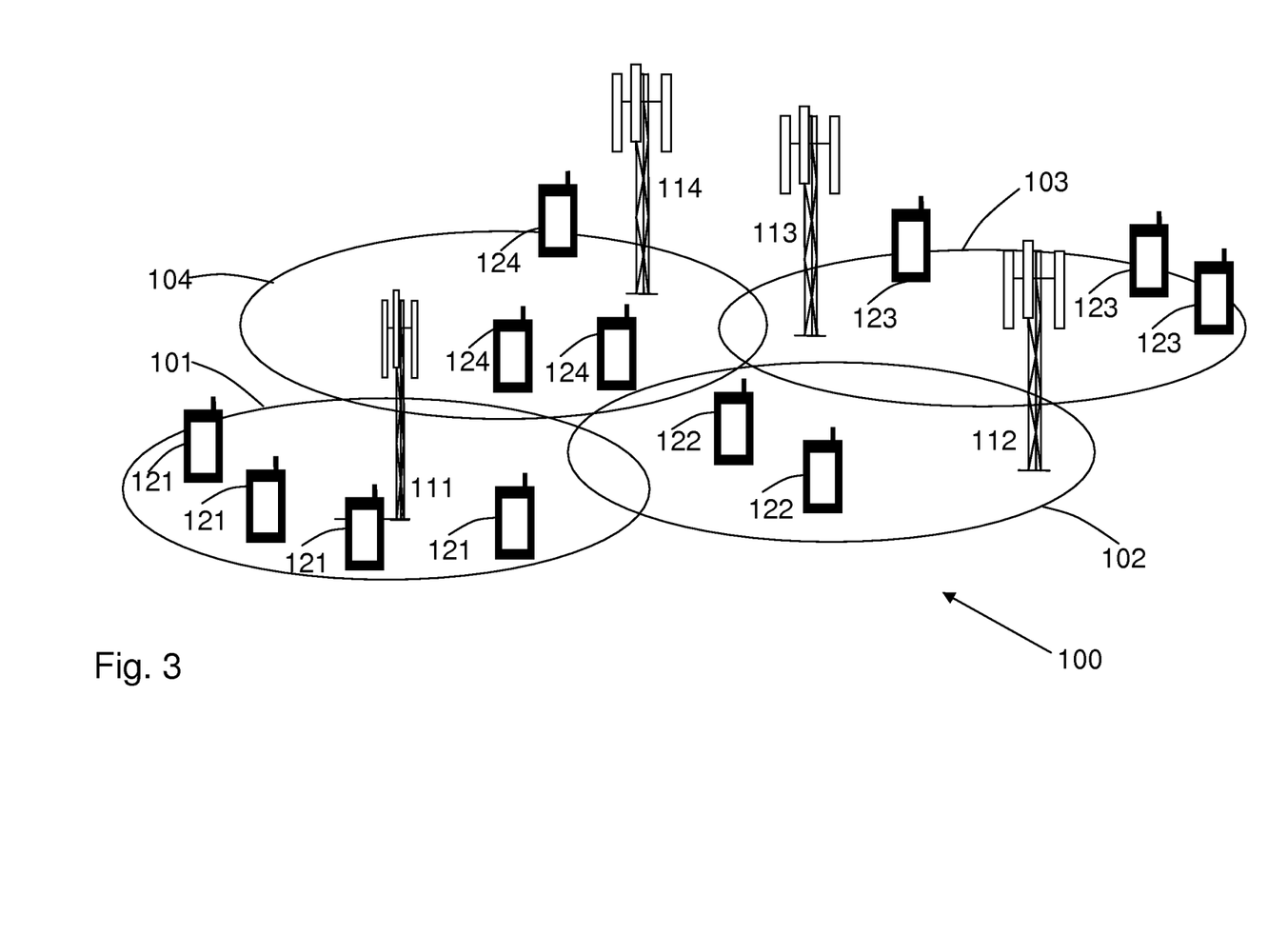
FIG. 3 is a schematic block diagram illustrating embodiments in a cellular network.

FIG. 3 depicts another scenario in the cellular network 100 in which embodiments herein may be implemented. Parts of this scenario comprise the scenario in FIG. 1, the reference numbers of which are reused in this scenario.

The cellular network 100 comprises the group of cells which in this example comprises four cells referred to as the first cell 101, the second cell 102, and further a third cell 103, and a fourth cell 104. The cells 101, 102, 102 and 104 in the group of cells may be neighbouring cells. The base station 111 is serving the first cell 101 and the second base station 112 serves the second cell 102. A third network node 113 is serving the third cell 103 and a fourth radio network node 114 serves the fourth cell 104. The radio network nodes 111, 112, 113, 114 are radio base stations which in this example e.g. may be eNBs, eNodeBs, or Home Node Bs, Home eNode Bs or any other network units capable to serve a user equipment or a machine type communication device in a cellular network.

A number of user equipments are active in the group of cells. In this example in the scenario of FIG. 3, twelve user equipments are active in the group of cells. Four first user equipments 121 are active in the first cell 101 and are configured to communicate within the cellular network 100 via the radio network node 111. Two second user equipments 122 are active in the second cell 102 and are configured to communicate within the cellular network 100 via the second radio network node 112. Three third user equipments 123 are active in the third cell 103 and are configured to communicate within the cellular network 100 via the third radio network node 113. Three fourth user equipments 124 are active in the fourth cell 104 and are configured to communicate within the cellular network 100 via the fourth radio network node 114.

As mentioned above, in some embodiments only one user equipment or up to a high number of user equipments, i.e. much more than 12, may be active in the group of cells.

The user equipments 121, 122, 123 and 124 may e.g. be mobile terminals or wireless terminals, mobile phones, computers such as e.g. laptops, Personal Digital Assistants PDAs or tablet computers, sometimes referred to as surf plates, with wireless capability, or any other radio network units capable to communicate over a radio link in a wireless network.

Figure 4:
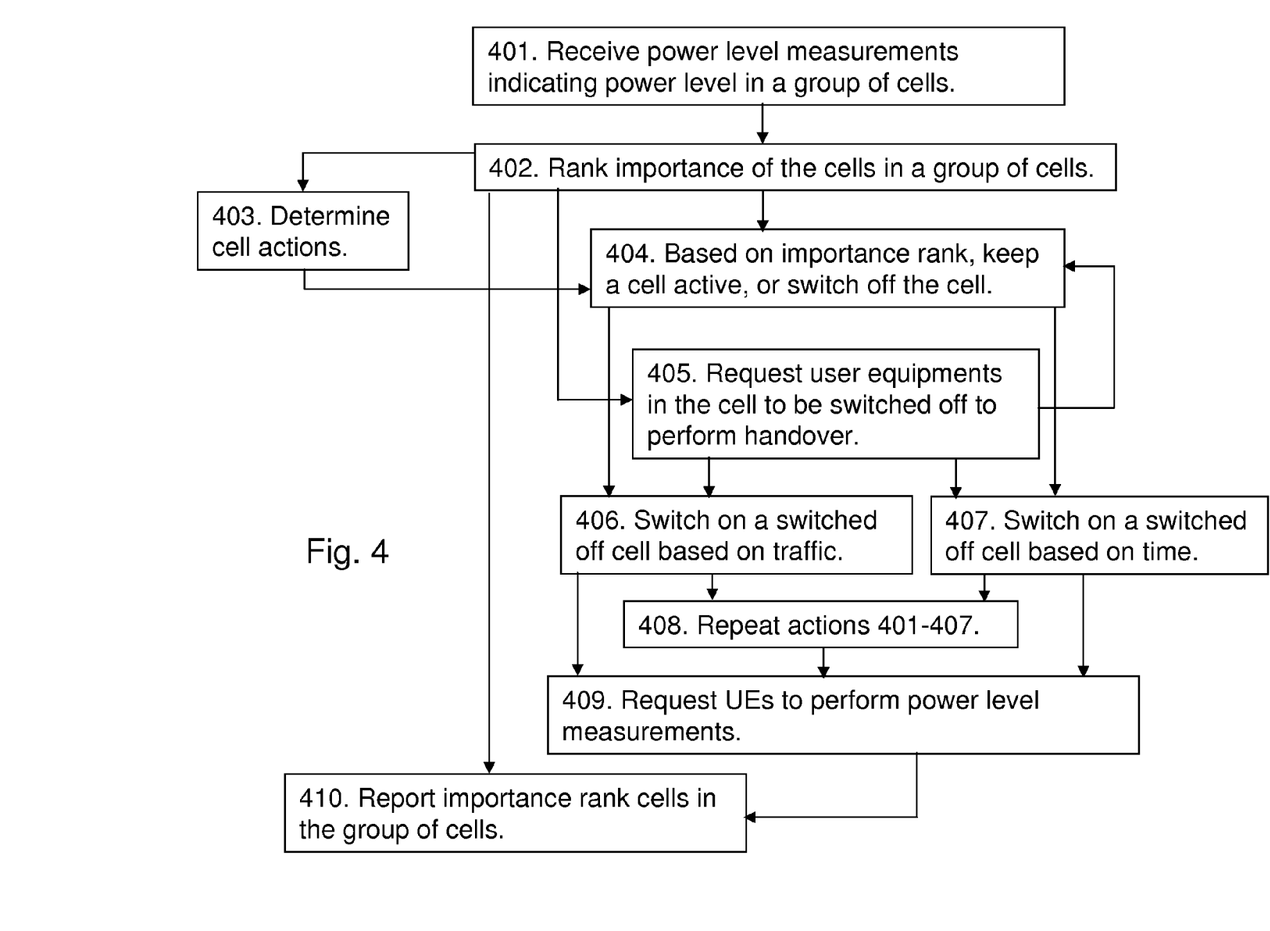
FIG. 4 is a flowchart depicting embodiments of a method in a radio network node.

Embodiments of a method in the radio network node 111 for ranking cells within a group of cells 101, 102, 103, 104 in the cellular network 100, will now be described with reference to the scenario of FIG. 3, and a flowchart depicted in FIG. 4. As mentioned above the radio network node 111 is serving the first cell 101. The group of cells comprises the first cell 101 and at least one more cell which in this scenario is the second cell 102, the third cell 103, and the fourth cell 104. The cellular network 100 further comprises the one or more active user equipments 121, 122, 123, 124. Each said active user equipment 121, 122, 123, 124 is active in at least one cell of said group of cells 101, 102, 103, 104.

The method comprises the following actions, which actions may as well be carried out in another suitable order than described below.

Action 401

In this action, information is collected by the radio network node 111, i.e. power level measurements are received from one or more of the active user equipments 121, 122, 123, 124, that are active in a target area, i.e. in the group of cells 101, 102, 103, 104. Each said power level measurement indicate a respective power level in at least one cell of the group of cells 101, 102, 103, 104 where the one or more active user equipments 121, 122, 123, 124 are active. The active user equipments 121, 122, 123, 124 will report their measurement of power levels on these cells and e.g. cell information of the cells in the group of cells, to the radio network node 111. The user equipments 122, 123, 124 being active in other cells 102, 103, 104 than the first cell 101 may report their measurement of power levels to its respective serving radio network node 112, 113, 114 which in turn will forward the measurement of power levels to the radio network node 111 e.g. via an X2 interface used in LTE. The cell information may e.g. comprise cell indicators, such as cell ID. In this example, the four respective first user equipments 121 each measures and reports power level on the first cell 101, the second cell 122, the third cell 123, and the fourth cell 124. The two respective second user equipments 122 each measures and reports power level on the first cell 101, the second cell 122, the third cell 123, and the fourth cell 124. Further the three respective third user equipments 123 each measures and reports power level on the first cell 101, the second cell 122, the third cell 123, and the fourth cell 124. Further the three respective fourth user equipments 124 each measures and reports power level on the first cell 101, the second cell 122, the third cell 123, and the fourth cell 124.

Each user equipment 121, 122, 123, 124 may keep its own cell list such as e.g. a cell list of its neighbouring cells, and is updating it with the latest power level measurement. This means that the user equipment cell list may only contain parts of the whole group of cells 121, 122, 123, 124 described above, not all of them. This action is similar to action 201 above.

Action 402

Priorities of the group of cells are then sorted by the radio network node 111. This is performed by ranking importance of the cells in the group of cells 101, 102, 103, 104. The ranking is based on the power level measurements. The ranking is further based on the number of active user equipments 121, 122, 123, 124 whose power level measurements indicate that a specific cell of out of the group of cells 101, 102, 103, 104 has the highest power level. This means that the ranking is further based on how many active user equipments 121, 122, 123, 124 reporting that this specific cell in the group of cells 101, 102, 103, 104 has the highest power level, which information have been collected and summarized by the power report from each of the active user equipments 121, 122, 123, 124. In other words, the of importance of the cells in the group of cells 101, 102, 103, 104 is ranked both based on the power level measurements, and on the number, for each cell out of the group of cells, of user equipments 121, 122, 123, 124 whose power level measurements indicate that the respective cell 101, 102, 103, 104 has the highest power level. This will be explained together with an example below. This action corresponds to action 202 above.

The ranking of importance may be decided based on the following rules:

TABLE 1

Table 1: Summary report of power level of cells from active user equipments.

| Cell | Power Level | | | |
|------|---------|--------|-------|-----|
|      | Highest | Second | Third | ... |
| 101  | x1      | x2     | x3    | ... |
| 102  | y1      | y2     | y3    | ... |
| 103  | z1      | z2     | z3    | ... |
| 104  | w1      | w2     | w3    | ... |
| ...  | ...     | ...    | ...   | ... |

Note:
101, 102, 103, 104 represents cells, and x1, y1, z1, w1, x2, y2 . . . represents numbers of user equipments. Highest, Second and Third stands for respective highest power level, second highest power level and third highest power level.

In table 1, four cells out of the group of cells are listed as an example. The four cells are indicated as 101, 102, 103, 104. Assume k user equipments are active in this group of cells 101, 102, 103, 104, i.e. according to the example of FIG. 3, k=12, i.e. twelve user equipments 121, 122, 123, 124 are active. Out of the k user equipments, x1 user equipments report that the first cell 101 provides the highest power level, y1 user equipments report that the second cell 122 has the highest power level, z1 user equipments report that the third cell 103 provides the highest power level, and w1 user equipments report that the fourth cell 124 has the highest power level, etc. Then the priority or importance of the cells may be decided as follows: If one cell is reported as having the highest power from most user equipments, it is given the highest priority, i.e. is ranked as having highest importance. For instance, if y1>z1>x1>w1 in the second column of Table 1, then the rank of importance of the cells is: 102>103>101>104. I.e. this means that the ranking is further based on the number of active user equipments 121, 122, 123, 124 whose power level measurements indicate that a specific cell of out of the group of cells 101, 102, 103, 104 has the highest power level.

The highest power level may often be from a cell on which a user equipment is camping. In some embodiments that is likely a micro cell and most user equipments camping on a micro cell will report the macro cell which the user equipment is within the reach of as the second best cell, i.e. with the second highest power level, which makes the macro cell become ranked as important.

This is an advantage because this addresses the handover issue between macro cells and micro cells. Sometimes forced handover is expected to be performed even if a user equipment is camping on a cell with highest power level. One example is the handover issue between macro and femto cells. In telecommunications, a femto cell is a small cellular base station. Femto cells deliver significantly improved coverage inside homes, small and large offices, and outdoor public spaces metro hotspots and rural. This means a stronger signal and better voice quality, plus improved data download and upload speeds. This stresses the importance of the cell with second highest power level, so user equipment number weighted importance of a cell, i.e. power level measurements plus the number of active user equipments 121, 122, 123, 124 whose power level measurements indicate that a specific cell of the group of cells 101, 102, 103, 104 has the highest power level, is considered instead of the absolute measured power level.

Action 403

Optimal cell actions of the group of cells 101, 102 103, 104 may be determined according to their importance as well as the absolute number of active user equipments.

As mentioned above, the cell 101 is served by the radio network node 111. If the cell 101 among the group of cells 101, 102 103, 104 has the highest priority, i.e. is ranked as the highest importance, the cell 101 shall be active and work at full power when other cells of the group of cells 101, 102 103, 104 may be switched off. In this example the second cell 102 has the highest priority and shall be kept active, but this is managed by the second network node 112 upon obtaining this ranking information, see Action 410.

If the cell 101 among the group of cells 101, 102 103, 104 is ranked as lower importance than the highest ranked importance, then the first cell 101 may be switched off. This may e.g. be for a predefined time period. In the example the cell 104 is ranked as lowest importance of the group of cells 101, 102 103, 104, as said above in this example w1<h1, therefore the fourth cell 104 may be switched off e.g. for a predefined time period, but this is managed by the fourth network node 114 upon obtaining this ranking information. h1 is an absolute threshold referred to as a first threshold value.

For a cell being ranked as lower importance than the highest ranked importance, in this example the first cell 101, and if h1<x1<h2, which means that the first cell 101 is still somewhat important despite of its low priority, the first cell 101 shall not be switched off. h2 is another pre-defined absolute threshold referred to as a second threshold value.

Nevertheless, the traffic load is relatively small. Therefore, adaptive beam forming may be used to save energy in the first cell 101.

For yet another cell ranked as lower importance than the highest ranked importance, take the third cell 103 as an example, if z1>h2, which means the traffic load is not small, the third cell 103 will keep working at its full power. If the first cell 101 has lower priority than the highest priority and the traffic load is not small, the first cell 101 will keep working at its full power.

Action 404

Based on the ranking of importance of the first cell 101, the first cell 101 is kept active, or is switched off and thereby power is saved. The importance ranking tells if it is possible to switch off the first cell 101 and thereby saving power, or if it is required that the first cell shall be kept switched on. I.e. in this action, if it is decided that the first cell 101 shall be switched off it is switched of, and if it is decided that the first cells 101 shall be kept active it is kept active. To switched off a cell may be performed by switching off the Power Amplifier of the cell to be switched off. This means that the radio transmission for the cell is switched off.

The action of switching off the first cell 101 is performed when the rank of importance of the cells indicates that the importance of the first cell 101 is lower than the importance of the cell having the highest rank of importance in the group of cells 101, 102, 103, 104, and the number of active user equipments 121, 122, 123, 124 in the group of cells 101, 102, 103, 104 whose power level measurements respectively indicate that the first cell 101 has the highest power level, is below a first threshold value. Please note that the highest power level is different for different user equipments, and that it is the highest power level measured by the respective user equipments.

The action of keeping the first cell 101 active is performed when the rank of importance of the cells in the group of cells 101, 102, 103, 104 indicates that the importance of the first cell 101 is highest.

The action of keeping the first cell 101 active is further performed when the rank of importance of the cells indicates that the importance of the first cell 101 is lower than the importance of the cell having the highest rank of importance in the group of cells 101, 102, 103, 104, and the number of active user equipments 121, 122, 123, 124 in the group of cells 101, 102, 103, 104 whose power level measurements respectively indicate that the first cell 101 has the highest power level, is between the first threshold value and the second threshold value.

The action of keeping the first cell 101 active is further performed when the rank of importance of the cells indicates that the importance of the first cell 101 is lower than the importance of the cell having the highest rank of importance in the group of cells 101, 102, 103, 104, and the number of active user equipments 121, 122, 123, 124 in the group of cells 101, 102, 103, 104 whose power level measurements respectively indicate that the first cell 101 has the highest power level, exceeds the second threshold value.

To switch off of a cell may provide energy savings in the order of 25-30%.

In the embodiments wherein a handover of the user equipments 121 of the cell to be switched off is forced or requested, the first cell 101 may be switched off after the active user equipments 121 has finished handover.

This action corresponds to action 203 above.

Action 405

In this optional action handover between cells will be forced or requested. Before the network node 111 take its corresponding actions by switching off the first cell 101, the active user equipments 121 camping on the first cell 101 that will be switched off may be forced or requested to handover to a neighbor cell that will be kept active. This means that the radio network node 111 requests the user equipments 121 that are active in the first cell 101 to perform handover to another cell that is active.

This action corresponds to action 205 above.

Action 406

This action relates to a wake-up procedure. If the first cell 101 has been switched off it may remain switched off until there is a need to wake up. Because the traffic load is changing all the time, the switched-off first cell 101 shall be waken up when traffic load in the switched off first cell 101 gets heavier. Some principles may be used to determine the wakeup time of the inactive first cell 101. In some embodiments information from the group of cells is detected that indicates that the switched off cell shall be switched on again. This is described in this action. As an alternative or in combination the wakeup may be based on long term prediction which is described in a following action. When any cell of the active group of cells, 102 103, 104 detects that the traffic load is heavier than a third threshold, the switched-off first cell 101 shall be waken up.

The active cells of the group of cells 102 103, 104 may detect this. If one cell, e.g. cell 102 detects the traffic load in the neighboring area is heavier, the radio network node serving this cell, e.g. the radio network node 112 in the example, will report this to the radio network node 111. This means that when the traffic load is heavier in the group of cells 102 103, 104, then the switched off cell 101 will be switched on for another round of priority judge.

This means that the radio network node 111 switches on the first cell 101 when it has obtained information that the number of active user equipments 121, 122, 123, 124 in the group of cells 102, 103, 104 has exceeded a third threshold value.

An advantage herein is that the wakeup procedure may consider both the group of cells and an individual cell, thus not only cover the uneven traffic load over time, but also over location.

This action corresponds to action 206 above.

Action 407

The alternative or combination wake up procedure is to perform wake up after a pre-defined time interval t. Which time interval t may advantageously be based on long term prediction. The long term prediction will be described more in detail below. In this case the radio network node 111 switches on the first cell 101 after a time period starting from the point in time when the first cell 101 was switched off. This may be performed by the radio network node 111 being configured to wake up the first cell 101 after the time interval t. This time interval may advantageously based on long term prediction and may be updated dynamically. This action also corresponds to action 206 above.

Action 408

After the switched off first cell 101 has been switched on again, a new round of cell ranking and cell actions may be taken, i.e. actions 401 to 407 may be repeated, to achieve power saving as well as best resource scheduling. Please note that this action may also be performed in the method embodiments described in conjuntion with FIG. 2 above.

Action 409

In this action the radio network node 111 may request the user equipments 121 located within the first cell 101 that was switched off and then has been switched on again, to perform power level measurements and choose an appropriate cell accordingly. This means that after the cell 101 is switched on, normal handover will be performed according to the power level measurements. It does not have to be a handover back to the same cell as before because a user equipment is also moving, therefore another round of power level measurement will be done and the appropriate cell will be chosen. This is so that these user equipments 121 get a possibility to perform handover to the first cell 101 when it has been switched on again. This action corresponds to action 205 above.

Action 410

In some embodiments, the base station 111 sends to at least one cell of the group of 102, 103, 104, i.e. the network node 112, 113,114 serving that/these cell(s) a report comprising the ranking of importance of the cells in the group of cells 101, 102, 103, 104. In this way, the base station 111 shares the ranking information with the other cells in the group of cells 102, 103, 104, so that they can make use of the ranking of importance to decide on whether to switch off their cells and save power, or keep their cells active based on the report from the network node 111.

This action corresponds to action 204 above.

The following is applicable to all embodiments above.

The Long Term Prediction LTP is described as follows and may be applied for determining the first, second and third threshold value and/or the time period t. Long term prediction means predicting the next threshold based on the historical statistics. One example is to do this by using accumulated histogram method. In statistics, a histogram is a graphical representation showing a visual impression of the distribution of data which in this case is a threshold value, such as any of the first, second and third threshold values, and/or the time period t. This means that the distribution of the past statistics is drawn using a histogram. In the histogram, the horizontal axis is the threshold and the vertical axis is the service quality, such as e.g. loss of calls, service coverage, access rate, speech quality, congestion degree corresponding to the threshold value. Then the distribution of the past statistics will be used to determine the current threshold using certain criteria, such as e.g. choose the threshold causing an acceptable service quality.

The pre-defined parameters such as the first threshold value h1, the second threshold value h2, the third threshold value h3, and the wake up time period t according to embodiments herein may be determined by long term prediction. Only h1 and h2 are mentioned in the following example, but the principle is the same for the third threshold value h3 and the time period t. h1 and h2, they are updated using moving average or accumulated histogram method as mentioned above. In statistics, a moving average, also called rolling average, rolling mean or running average, is a type of finite impulse response filter used to analyze a set of data points by creating a series of averages of different subsets of the full data set. A weighted average is any average that has multiplying factors to give different weights to data at different positions in the sample window. The accumulated histogram method is to determine a current value according to the statistical distribution of the earlier data. The first threshold value h1, the second threshold value h2, and the third threshold value from last prediction is first adopted this time. This time means that the current thresholds are obtained by the last prediction. Then the service indicators such Quality of Service (QoS) or loss of calls are calculated. Updated optimal first threshold value h1, second threshold value h2 and third threshold value are determined based on the calculated indicators. The first threshold value h1, the second threshold value h2 and the third threshold value for next time is then updated. This means the current prediction gives the thresholds for next round calculation. The first threshold value h1, the second threshold value h2 and the third threshold value for next time may be updated as for example:

$$h1\_next = (1-\alpha)*h1\_last + \alpha*h1\_new$$

$$h2\_next = (1-\alpha)*h2\_last + \alpha*h2\_new$$

where $\alpha$ is a smoothing factor. This is weighted moving average. The smoothing factor $\alpha$ is a weight. This may reduce the effect of extreme values. Last is the threshold used in last round, new means the optimal value calculated this time, and next means the value that will be adopted for next round.

For wakeup time period t, similar update procedure may be used as for h1 and h2.

This may be performed by:
1. Apply the parameters from last LTP
2. Calculate service indicators such as loss of calls
3. Determine new optimal parameters
4. Update the parameters using moving average method An advantage with embodiments herein is that the long term prediction provides optimized cell actions and thus a better compromise between power saving and service quality.

The reduction of the energy consumption, i.e. power saving in the cellular network 100 not only minimizes the environmental impact on climate change, but also it reduces the operational expenses.

Figure 5:
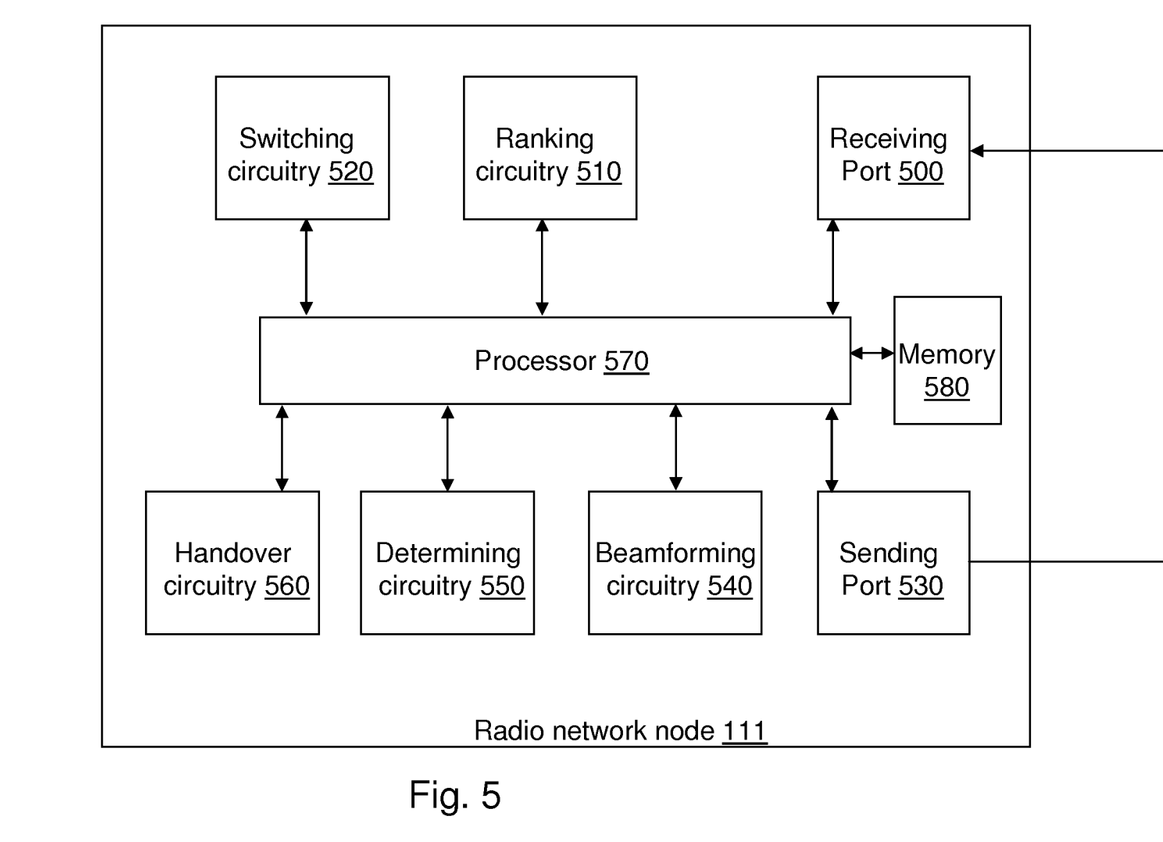
FIG. 5 is a schematic block diagram illustrating embodiments of a radio network node.

To perform the method actions for ranking cells within the group of cells 101, 102, 103, 104 in the cellular network 100 described above in relation to FIG. 2 and FIG. 4, the radio network node 111 comprises the following arrangement depicted in FIG. 5. As mentioned above the radio network node 111 is adapted to serve the first cell 101. Each said user equipment 121, 122, 123, 124 is active in at least one cell of said group of cells 101, 102, 103, 104.

The radio network node 111 comprises a receiving port 500 configured to receive power level measurements from one or more of the user equipments 121, 122, 123, 124. The power level measurements respectively indicate a power level in at least one cell of the group of cells 101, 102, 103, 104 where the respective one or more active user equipments 121, 122, 123, 124 is active.

The radio network node 111 further comprises a ranking circuitry 510 configured to rank importance of the cells in the group of cells based on the power level measurements, and based on the number of active user equipments 121, 122, 123, 124 whose power level measurements indicate that a specific cell of out of the group of cells 101, 102, 103, 104 has the highest power level. This means that the ranking circuitry 510 is configured to rank importance of the cells in the group of cells based on the power level measurements, and based on the number, for each cell out of the group of cells, of user equipments 121, 122, 123, 124 whose power level measurements indicate that the respective cell 101, 102, 103, 104 has the highest power level.

The radio network node 111 may further comprises a switching circuitry 520 configured to, based on the of importance of the first cell 101, keep the first cell active, or switch off the first cell 101 thereby saving power.

The switching circuitry 520 may further be configured to keep the first cell 101 active when the rank of importance of the cells in the group of cells 101, 102, 103, 104 indicates that the importance of the first cell 101 is highest.

In some embodiments the switching circuitry 520 further is configured to switch off the first cell 101 when the rank of importance of the cells indicates that the importance of the first cell 101 is lower than the importance of the cell having the highest rank of importance in the group of cells 101, 102, 103, 104, and the number of active user equipments 121, 122, 123, 124 in the group of cells 101, 102, 103, 104 whose power level measurements respectively indicate that the first cell 101 has the highest power level, is below a first threshold value.

The switching circuitry 520 may further be configured to keep the first cell 101 active when the rank of importance of the cells indicates that the importance of the first cell 101 is lower than the importance of the cell having the highest rank of importance in the group of cells 101, 102, 103, 104, and the number of active user equipments 121, 122, 123, 124 in the group of cells 101, 102, 103, 104 whose power level measurements indicate that the first cell 101 has the highest power level, is between the first threshold value and a second threshold value.

In some embodiments, the switching circuitry 520 further is configured to keep the first cell 101 of the group of cells 101, 102, 103, 104 active, when the rank of importance of the cells indicates that the importance of the first cell 101 is lower than the importance of the cell having the highest rank of importance in the group of cells 101, 102, 103, 104, and the number of active user equipments 121, 122, 123, 124 in the group of cells 101, 102, 103, 104 whose power level measurements respectively indicate that the first cell 101 has the highest power level, exceeds the second threshold value.

The switching circuitry 520 may further be configured to switch on the first cell 101 when the first cell 101 has been switched off. This may be configured to be performed when the switching circuitry 520 obtains information that the number of active user equipments 121, 122, 123, 124 in the group of cells 102, 103, 104 has exceeded the third threshold value. This may further be configured to be performed after a time period starting from the point in time when the first cell 101 was switched off.

The radio network node 111 further comprises a sending port 530 which may be configured to send to the at least one cell of the group of 102, 103, 104, i.e. not to the first cell 101, a report comprising the ranking of importance of cells in the group of cells 101, 102, 103, 104.

In some embodiments, the radio network node 111 further comprising a beam forming circuitry 540 configured to perform adaptive beamforming in the first cell 101 when it is kept active in order to save power in the first cell 101.

The radio network node 111 may further comprise a determining circuitry 550 configured to determine the first threshold value, the second threshold value, and/or the third threshold value based on long term prediction. The first threshold value, second threshold value, and/or third threshold value are related to a respective number of active user equipments 121, 122, 123, 124 in the group of cells 101, 102, 103, 104.

In some embodiments, the determining circuitry 550 is further configured to determine the time period based on long term prediction.

The radio network node 111 may further comprise a handover circuitry 560 configured to request the user equipments 121 that are active in the first cell 101 to perform handover to another cell that is active, before switching off the first cell 101.

In some embodiments, the handover circuitry 560 further is configured to request user equipments 121 located within the first cell 101 that was switched off and then has been switched on again, to perform power level measurements and choose an appropriate cell accordingly after the first cell 101 has been switched on.

The embodiments herein for ranking cells in a group of cells 101, 102, 103, 104 in the cellular network 100 may be implemented through one or more processors, such as a processor 570 in the radio network node 111 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the in the radio network node 111. One such carrier may be in the form of a CD ROM disc. It is however feasible with other data carriers such as a memory stick. The computer program code may furthermore be provided as pure program code on a server and downloaded to the radio network node 111.

The radio network node 111 may further comprise a memory 580 comprising one or more memory units. The memory 580 is arranged to be used to store data, received data streams, power level measurements, ranking of importance of the cells in the group of cells 101, 102, 103, 104, threshold values, time periods, detection of traffic load, configurations, schedulings, and applications to perform the methods herein when being executed in the radio network node 111.

Those skilled in the art will also appreciate that the receiving port 500, the ranking circuitry 510, the switching circuitry 520, the sending port 530, the beam forming circuitry 540, the determining circuitry 550, and the handover circuitry 560 described above may refer to a combination of analog and digital circuits, and/or one or more processors configured with software and/or firmware, e.g. stored in a memory, that when executed by the one or more processors such as the processor 570 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method in a radio network node for ranking cells within a group of cells in a cellular network the method comprising:
   receiving power level measurements from each of a first plurality of user equipments active in a first cell, wherein the power level measurements indicate a power level in at least a first cell and a second cell within the group of cells,
   receiving, via a second radio network node, power level measurements from each of a second plurality of user equipments active in a second cell, wherein the power level measurements indicate a power level in at least the first cell and the second cell within the group of cells, and identifying the first cell as a highest ranked cell within the group of cells, wherein a greater number of user equipments within the first plurality of user equipments and the second plurality of user equipments identified the first cell as having the highest power level of the at least first cell and second cell within the group of cells.

2. The method according to claim 1, further comprising:
in response to determining that the highest ranked cell is the first cell switching off the second cell thereby saving power.

3. The method according to claim 1, further comprising:
sending to at least one cell of the group of cells a report comprising identifying at least the highest ranked cell in the group of cells.

4. The method according to claim 1, further comprising:
in response to determining that the highest ranked cell is the first cell, keeping the first cell active.

5. The method according to claim 1, further comprising:
determining that the highest ranked cell is the first cell;
determining that the number of user equipments whose power level measurements indicate that the second cell has the highest power level is below a first threshold value; and
switching off the second cell thereby saving power.

6. The method according to claim 1, further comprising:
determining that the highest ranked cell is the first cell;
determining that the number of user equipments in the group of cells whose power level measurements indicate that the second cell has the highest power level is between a first threshold value and a second threshold value; and
keeping the second cell active.

7. The method according to claim 1 further comprising:
determining that the highest ranked cell is the first cell;
determining that the number of user equipments whose power level measurements indicate that the second cell has the highest power level exceeds a first threshold value; and
keeping the second cell active.

8. The method according to claim 2, further comprising:
switching on the first cell when obtaining information that a number of user equipments in the group of cells exceeds a first threshold value.

9. The method according to claim 8, wherein the first threshold value is determined based on long term prediction, and the first threshold value is related to the number of user equipments in the group of cells.

10. The method according to claim 2, further comprising:
prior to switching off the first cell, requesting the user equipments comprised in the first cell to perform handover to another cell that is to be kept active.

11. A radio network node for ranking cells within a group of cells in a cellular network, which radio network node is adapted to serve a first cell, in the group of cells, the radio network node comprising:
a receiving port configured to:
receive power level measurements from each of a first plurality of user equipments active in a first cell, wherein the power level measurements indicate a power level in at least a first cell and a second cell within the group of cells; and
receive, via a second radio network node, power level measurements from each of a second plurality of user equipments active in a second cell, wherein the power level measurements indicate a power level in at least the first cell and the second cell within the group of cells; and a ranking circuitry configured to identify the first cell as a highest ranked cell within the group of cells, wherein a greater number of user equipments within the first plurality of user equipments and the second plurality of user equipments identified the first cell as having the highest power level of the at least first cell and second cell within the group of cells.

12. The radio network node according to claim 11, further comprising:
a switching circuitry configured to switch off the second cell thereby saving power in response to a determination that the highest ranked cell is the first cell.

13. The radio network node according to claim 11, further comprising a sending port configured to send to at least one cell of the group of cells a report identifying at least the highest ranked cell in the group of cells.

14. The radio network node according to claim 11, further comprising;
a switching circuitry configured to keep the first cell active in response to a determination that the highest ranked cell is the first cell.

15. The radio network node according to claim 11, further comprising:
a determining circuitry configured to determine the number of user equipments in the group of cells whose power level measurements indicate that the second cell has the highest power level is below a first threshold value; and
a switching circuitry configured to switch off the second cell.

16. The radio network node according to claim 11, further comprising:
a determining circuitry configured to determine that the number of user equipments in the group of cells whose power level measurements respectively indicate that the second cell has the highest power level is between a first threshold value and a second threshold value; and
a switching circuitry configured to keep the second cell active.

17. The radio network node according to claim 11, further comprising;
a determining circuitry configured to determine that the number of user equipments whose power level measurements indicate that the second cell has the highest power level exceeds a first threshold vale; and
a switching circuitry configured to keep the second cell active.

18. The radio network node according to claim 12, wherein the switching circuitry is further configured, after the second cell has been switched off, to:
switch the second cell on when a number of user equipments in the group of cells exceeds a first threshold value.

19. The radio network node according to claim 18, further comprising the determining circuitry is further configured to determine the first threshold value based on long term prediction, wherein the first threshold value is related to the number of user equipments in the group of cells.

20. The radio network node according to claim 12, further comprising a handover circuitry configured to request the user equipments that are active in the first cell to perform handover to another cell that is to be kept active, before switching off the second cell.

* * * * *